(12) United States Patent
Buhlmann et al.

(10) Patent No.: US 10,212,963 B2
(45) Date of Patent: Feb. 26, 2019

(54) FOAMING DEVICE AND CORRESPONDING METHOD (71) Applicant: Rancilio Group S.P.A., Villastanza di Parabiago (MI) (IT)

(72) Inventors: Marco Buhlmann, Villastanza di Parabiago (IT); Carlo Carbonini, Villastanza di Parabiago (IT)

(73) Assignee: Rancilio Group S.P.A., Villastanza di Parabiago (MI) (IT)

( * ) Notice: Subject to any disclaimer, the term of this patent is extended or adjusted under 35 U.S.C. 154(b) by 0 days.

(21) Appl. No.: 15/559,734

(22) PCT Filed: Mar. 7, 2016

(86) PCT No.: PCT/IB2016/051276
§ 371 (c)(1),
(2) Date: Sep. 19, 2017

(87) PCT Pub. No.: WO2016/151422
PCT Pub. Date: Sep. 29, 2016

(65) Prior Publication Data
US 2018/0042290 A1 Feb. 15, 2018

(30) Foreign Application Priority Data
Mar. 20, 2015 (IT) .............................. TO2015A0177

(51) Int. Cl.
*A47J 31/00* (2006.01)
*A47J 31/22* (2006.01)
(Continued)

(52) U.S. Cl.
CPC ............... *A23P 30/40* (2016.08); *A47J 31/40* (2013.01); *A47J 31/4485* (2013.01)

(58) Field of Classification Search
CPC ........ A47J 31/00; A47J 31/04–31/0576; A47J 31/22; A47J 31/40; A47J 31/405
(Continued)

(56) References Cited

U.S. PATENT DOCUMENTS 2,344,888 A * 3/1944 Lindgren .................. B04B 1/08
494/57
6,397,909 B1 * 6/2002 Nelson ................. B67D 1/1438
141/263
(Continued)

FOREIGN PATENT DOCUMENTS

DE 19719784 C1 7/1998
DE 20204085 U1 6/2002
(Continued)

*Primary Examiner* — Michael Laflame, Jr.
(74) *Attorney, Agent, or Firm* — Howson & Howson LLP (57) ABSTRACT

Device for foaming a liquid comprising a mixing unit (30). The mixing unit (30) comprises a first element (31) having an inner surface (33), a second element (34) having an outer surface (35), a gap (36) between the inner surface (33) of the first element (31) and the outer surface (35) of the second element (34), a first opening (37) and a second opening (38) connected through the gap (36). At least one of the first element (31) or the second element (34) is rotatable about an axis of rotation (AR) with respect to the other one. The inner surface (33) and the outer surface (35) are symmetric with respect to a common axis of symmetry (AH, AW), coincident with the axis of rotation (AR), and have circular sections, perpendicularly to the axis of symmetry, having diameters which increase going in a direction along the axis of symmetry (AH, AW).

17 Claims, 6 Drawing Sheets

(51) Int. Cl.
*A47J 31/40* (2006.01)
*A23P 30/40* (2016.01)
*A47J 31/44* (2006.01)

(58) Field of Classification Search
USPC ..... 99/275, 279–283, 323.1, 323.3, 452–466
See application file for complete search history.

(56) References Cited

U.S. PATENT DOCUMENTS

| | | | | |
|---|---|---|---|---|
| 6,698,625 | B2* | 3/2004 | Ufheil | A47J 31/401 222/129.1 |
| 7,690,366 | B1* | 4/2010 | Soubjaki | F02D 9/16 123/336 |
| 8,820,214 | B2* | 9/2014 | Green | A47J 31/401 222/145.6 |
| 2002/0020302 | A1* | 2/2002 | Heczko | A23L 2/00 99/317 |
| 2003/0172816 | A1 | 9/2003 | Mahlich | |
| 2004/0009281 | A1 | 1/2004 | Green | |
| 2005/0118319 | A1 | 6/2005 | Green et al. | |
| 2007/0245902 | A1* | 10/2007 | Frigeri | A47J 31/36 99/279 |
| 2009/0107342 | A1* | 4/2009 | Piscaer | A47J 31/401 99/323.1 |
| 2009/0323459 | A1* | 12/2009 | Windhab | B01F 3/04269 366/105 |
| 2010/0139493 | A1* | 6/2010 | Nevarez | B67D 1/0021 99/275 |
| 2010/0319363 | A1* | 12/2010 | Dieckmann | F25D 31/007 62/56 |
| 2011/0139847 | A1* | 6/2011 | Boussemart | B65B 69/00 225/103 |
| 2011/0158036 | A1 | 6/2011 | Koopman et al. | |
| 2013/0112083 | A1* | 5/2013 | Douma | A47J 31/4485 99/294 |
| 2014/0322415 | A1 | 10/2014 | Buchholz et al. | |
| 2016/0000257 | A1* | 1/2016 | Ait Bouziad | A47J 31/4485 426/474 |
| 2016/0367071 | A1 | 12/2016 | Dollner et al. | |

FOREIGN PATENT DOCUMENTS

| | | |
|---|---|---|
| DE | 102013224786 B3 | 3/2015 |
| EP | 2798988 A1 | 11/2014 |
| WO | 2014/096183 A1 | 6/2014 |

* cited by examiner

FOAMING DEVICE AND CORRESPONDING METHOD

FIELD OF INVENTION

The present invention relates, in general, to a device for foaming a liquid. In particular, the present invention relates to a device for foaming milk by mixing air and milk and making them pass through the device with Taylor-Couette flow.

However, the invention is not limited to milk, but can also be applied to other liquids, e.g. coffee, chocolate drink, soy milk, nut milk (such as almond milk, macadamia milk etc.). Consequently, foams other than milk foam can be achieved by the present invention as well.

The invention also relates to a method for foaming milk by means of such a device and to a machine for producing foamed beverages including the device.

DESCRIPTION OF RELATED ART

In the field of beverages production, devices capable of foaming a liquid, in particular milk, are well known.

There are different types of foaming devices (foamers) that use different foaming techniques.

One of these techniques is based on the so-called Couette flow, i.e. the laminar flow of a viscous fluid in a space between two parallel plates; this laminar flow is driven by a drag force that acts on the fluid and is generated by the relative movement of one plate with respect to the other.

Document WO2014096183A1 discloses a device for producing milk foam which exploits the abovementioned Couette flow of milk and air.

The disclosed device comprises an outer and an inner cylinder arranged concentrically. Milk and air are supplied to an inlet of the device, and then they flow in a gap between an outer wall of the inner cylinder and an inner wall of the outer cylinder, toward an outlet of the device. In order to foam the milk, the cylinders rotate with respect to each other, so that the milk-air mixture in the gap experiences high shear stress. The shear stress, which is achieved by designing the device so that the milk-air mixture passes, at least partially, through the device with Couette flow, leads to an emulsion of air and milk. The emulsified milk-air mixture expands when it leaves the gap and thus a foaming effect is achieved.

The Applicant has experimentally found that the known prior art is not able to obtain good quality milk foam, i.e. a milk foam which is stable, capable of maintaining its volume, and neither large-bubbled nor dry, and which has a proper foaming level, i.e. a proper foam volume compared to the volume of the supplied milk.

As a matter of fact, good quality of the milk foam is affected by different parameters, such as milk viscosity, which changes according to the type of milk (such as whole milk, reduced-fat milk etc.), milk temperature and the speed of the cylinders that rotate with respect to each other.

One problem of the known prior art is that the good quality of the milk foam cannot be ensured by only changing the speed of the cylinders rotating with respect to each other.

In other words, the Applicant has found that the device disclosed in the cited prior art has the problem of not being able to achieve a good quality milk foam as a function of the characteristics of the milk being used, such as its viscosity or its temperature.

It is an object of the present invention to overcome the problems of the prior art mentioned above.

SUMMARY OF THE INVENTION

According to the present invention, the above object is achieved by a device and method for foaming a liquid, in particular milk, having the features set forth in the appended claims.

The claims are an integral part of the technical teaching provided herein in respect of the invention.

The following synthetic description of the invention is given in order to provide a basic understanding of some aspects of the invention. Such a synthetic description is not a thorough description and, as such, it is not to be intended as being suitable for identifying key or critical elements of the invention or for defining the scope of the invention. It is only aimed at setting forth some concepts of the invention in a simplified manner, as an anticipation of the detailed description given below.

In accordance with a feature of a preferred embodiment, the device for foaming the liquid comprises a first element having an inner surface, for example the surface of a conical cavity of a hollow housing, and a second element having an outer surface, for example the outer surface of a conical wheel, wherein the first element and the second element are rotatable with respect to each other and are such that a gap having a determined width is comprised between the inner surface of the first element and the outer surface of the second element.

The proposed structural feature is such to provide different linear speeds along the gap and a better control of the foam stability.

In accordance with another feature of a preferred embodiment, the gap connects a first opening and a second opening of the device.

In accordance with a further feature of a preferred embodiment, an axis of symmetry common to the inner surface and the outer surface intersects the gap.

In accordance with a further feature of a preferred embodiment, at least one of the first or the second element is moveable in a direction along said axis of symmetry, so as to change the gap between the inner surface and the outer surface.

BRIEF DESCRIPTION OF THE DRAWINGS

The above and other features and advantages of the present invention will become apparent from the following description of preferred embodiments made by way of a non-limiting example with reference to the accompanying drawings, in which elements denoted by a same or similar numerical reference correspond to components having the same or similar function and construction, and in which.

DETAILED DESCRIPTION OF THE INVENTION

Figure 1:
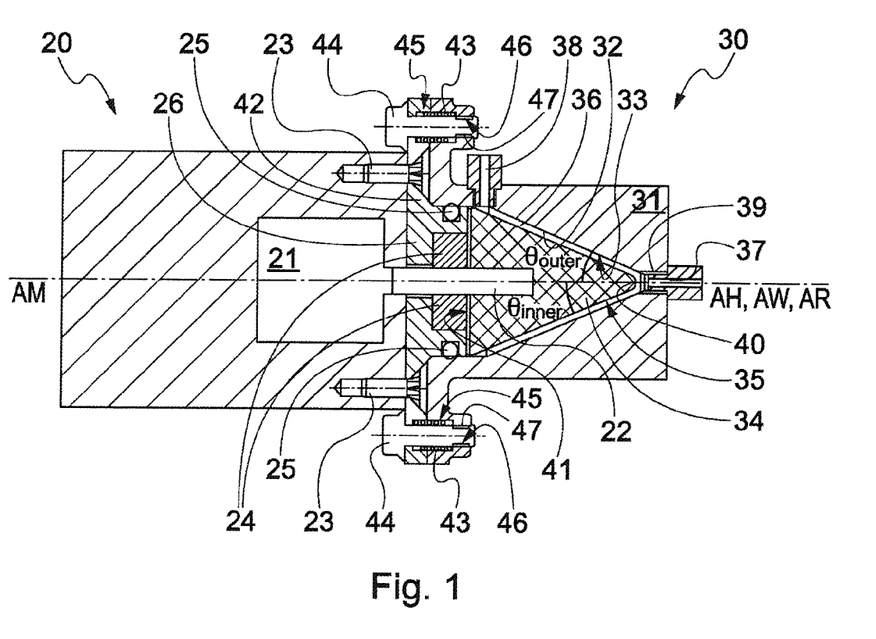
FIG. 1 shows a device for foaming a liquid according to the invention with a first embodiment of a mixing unit.

Referring to FIG. 1, a device for foaming a liquid (foaming device) 10, according to the preferred embodiment, comprises a driving unit 20, including a motor 21, and a mixing unit 30.

The mixing unit 30 comprises a first element having an inner surface, for example the inner surface 33 of a hollow housing 31, i.e. a housing having a cavity 32, and a second element having an outer surface, for example the outer surface 35 of a wheel 34, rotatable with respect to the housing 31.

The wheel 34 is arranged inside the housing 31 so that a gap 36 having a determined width is formed between the housing 31 and the outer surface 35 of the wheel 34. The gap 36 connects at least a first opening 37 to a second opening 38, both openings being provided in the housing 31.

According to the preferred embodiment, the first opening 37 is adapted to receive from the outside air and the liquid to be foamed, thus serving as an inlet. The second opening 38 is adapted to dispense the foamed liquid out of the mixing unit 30, thus serving as an outlet.

According to the preferred embodiment, the gap 36 extends over a substantial portion of the outer surface 35 of the wheel 34 and of the inner surface 33 of the hollow housing 31.

According to the preferred embodiment, the inner surface 33 of the hollow housing 31 is symmetric with respect to an axis of symmetry AH. The wheel 34 is also symmetric with respect to an axis of symmetry AW, and it is placed inside the housing 31 so as to be concentric with the inner surface 33 of the hollow housing 31. Therefore, the axis of symmetry AH of the cavity and the axis of symmetry AW of the wheel coincide.

More particularly, according to the preferred embodiment, the outer surface 35 of the wheel 34 and the inner surface 33 of the hollow housing 31 have circular sections (taken perpendicularly to the axes of symmetry AH, AW); furthermore said surfaces have, preferably, the same shape so that the gap 36 has a substantially uniform width (understood as the distance between the inner surface 33 and the outer surface 35, wherein the distance is taken perpendicular to the inner and outer surface).

In particular, the circular sections of the inner surface 33 of the hollow housing 31 and of the outer surface 35 of the wheel 34 have diameters which increase in a direction along said axes of symmetry AH, AW; preferably, the outer surface 35 and the inner surface 33 are conical.

This structural feature allows to obtain different linear speeds of the outer surface 35 of the wheel 34 with respect of the inner surface 33 of the hollow housing 31, which, in turn, as explained later, allows to obtain a more stable foamed beverage.

According to the preferred embodiment, the conical outer surface 35 of the wheel 34 has an angle $\theta_{outer}$ between its axis AW and one of its generatrices which is equal to an angle $\theta_{inner}$ between the axis AH of the conical inner surface 33 of the hollow housing 31 and one of its generatrices.

Preferably, the angles $\theta_{outer}$, $\theta_{inner}$ are comprised between 5° and 85°.

More preferably, the angles $\theta_{outer}$, $\theta_{inner}$ are comprised between 20° and 70°. Preferably, the first opening 37 is located at the apex 39 of the conical inner surface 33 of the hollow housing 31, alongside its axis of symmetry AH, or in a region next to the apex 40 of the conical wheel 34, i.e. where the wheel 34 and the cavity 32 have their smallest diameter.

The second opening 38 is preferably located at a peripheral point of the circular base 42 of the conical cavity 32 or, equivalently, in a region next to the periphery of the circular base 41 of the conical wheel 34, i.e. where the wheel 34 and the cavity 32 have their largest diameter.

Preferably, the second opening 38 is radial with respect to the inner surface 33 of the hollow housing 31.

In accordance with other embodiments, the second opening 38 is tangential to the inner surface 33.

According to the preferred embodiment, the driving unit 20 comprises, preferably, a motor 21 arranged to drive a shaft 22, which is connected to the wheel 34 of the mixing unit 30.

The driving unit 20 is configured to rotate the wheel 34 relative to the fixed inner surface 33 of the hollow housing 31, about the axis of symmetry AH of the conical cavity 32 and the axis of symmetry AW of the wheel 34 (which are therefore coincident with the axis of rotation AR of the wheel).

The shaft 22 rotates about an axis of rotation AM, which is, preferably, coincident with the axis of rotation AR of the wheel 34.

The motor 21 is preferably aligned with the shaft 22 or, according to further embodiments, the motor and the shaft are misaligned relative to each other.

According to the preferred embodiment, a body 26 is interposed between the motor 21 and the housing 31 and is fixed to the driving unit 20 by means of fixing components 23, such as rivets.

Preferably, the foaming device 10, in use, is placed in horizontal direction, i.e. with the axis of rotation AR or, equivalently, with the axes of symmetry AH, AW arranged along the horizontal direction, though other directions are possible.

Preferably, the width of the gap 36 is comprised between 0.1 mm and 3 mm, more preferably between 0.2 mm and 1 mm.

According to the preferred embodiment, the width of the gap 36 can be increased or decreased, in the range suggested above, so as to enhance the stability of the foam by selecting the proper width as a function of the characteristics of the liquid to be foamed.

According to the preferred embodiment, the proper width as a function of the characteristics of the liquid to be foamed is selected before operating the foaming device 10 and, in use, the gap 36 has a determined width.

Preferably, the width of the gap 36 is changed by moving the housing 31 relative to the wheel 34, along the direction of the axes of symmetry AH, AW (axial direction). For example, the housing 31 can be raised or lowered by using known components, such as screws or gears, so that a continuous regulation of the width of the gap 36 can be achieved.

According to the preferred embodiment, shown in FIG. 1, screws 44 are provided, which are adapted to be placed in holes 46. The holes 46 are provided in a region of contact between the body 26 and the hollow housing 31, passing through both the body and the housing. A portion of the hole 46 formed in the housing 31 is provided with a threaded wall 47, adapted to couple with the screw 44, so that the rotation of the screws makes the housing 31 move along the axial direction.

Preferably, the screws 44 are mechanically driven.

Preferably the body 26 is self-centering with respect to the hollow housing 31.

Preferably, the foaming device 10 also comprises resilient elements 43, for instance springs, which wrap around the screws 44 and are placed in annular recesses 45 suitably provided in walls of the holes 46. The springs 43 are arranged to act against the action of the threads 44, thus helping to maintain the width of the gap 36 stable.

Preferably, the holes 46, and therefore the springs 43 and the screws 44, are at least two, equally spaced around the axes of symmetry AW, AH.

In order to avoid leakages of liquid between the mixing unit 30 and the driving unit 20, a gasket 24 is preferably placed around the shaft 22 of the motor 21 between the body 26 and the shaft 22, preferably not in contact with the base 41 of the wheel 34.

According to further embodiments, the gasket 24 or a further gasket 25 is provided between the housing 31 and the body 26.

The foaming device 10 has, optionally, a heating function, in order to heat the liquid during foaming. This function is carried out by means of a heating element, for example an electric heating element of known type. Preferably, the heating element is integrated either in the housing 31 or in the wheel 34.

According to other embodiments, the foaming device is provided with other components to move the housing 31 along the axial direction. Examples of embodiments comprising these alternative solutions are described below.

Figure 5:
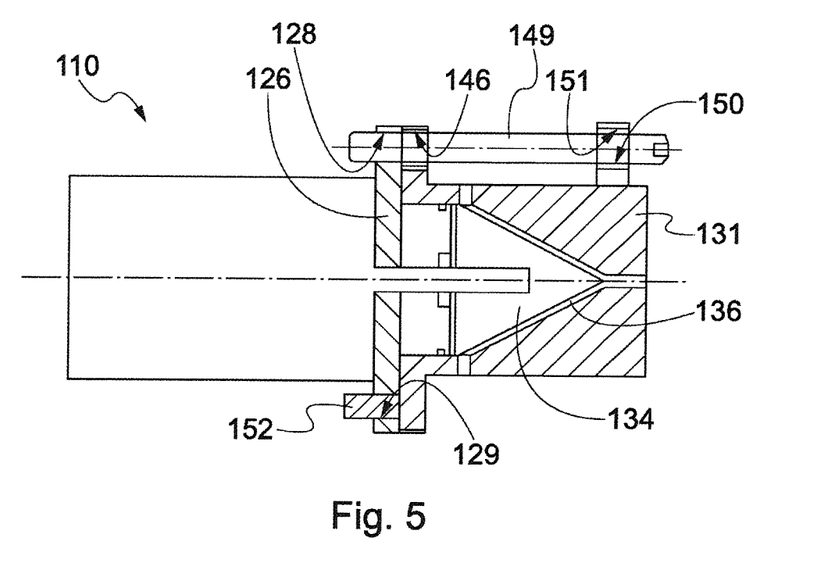
FIG. 5 shows a second embodiment of the foaming device.

For example, FIG. 5 shows a foaming device 110 comprising an at least partially threaded rod 149, preferably arranged outside the housing 131.

The rod 149 passes through a hole 146 provided in a region of contact between a body 126 and a hollow housing 131, and passing through both the body and the housing. The rod 149 is coupled with a left-handed threaded wall 128 provided in a portion of the hole 146 formed in the body 126. The rod 149 also passes through a further hole 150 of the housing 131, where it is coupled with a right-handed threaded wall 151 of the hole 150, so that the rotation of the rod 149 makes the housing 131 move along the axial direction in opposite directions, thus closer to or away from the body 126.

This allows to change the width of the gap 136 between the housing 131 and the wheel 134. Preferably, this embodiment further comprises a guiding component for the axial movement of the housing 131, for example a pin 152 adapted to slide in a hole 129 provided in the body 126.

According to another example, a foaming device comprises a housing having an inner threaded wall. The threaded wall is adapted to couple with a corresponding outer threaded wall of a body interposed between a motor and the housing, so that the housing can be moved along the axial direction by rotating the housing with respect to the body, which is maintained fixed. This allows to change the width of the gap between the housing and the wheel.

According to another example, a foaming device comprises a housing having an inner hollow cylinder and an outer hollow cylinder. The outer cylinder is fixed to a body interposed between a motor and the housing, by means of fixing components, for example rivets. An inner surface of the outer cylinder comprises a threaded portion adapted to couple with a threaded portion of an outer surface of the inner cylinder, so that a rotation of the inner cylinder makes it slide with respect to the outer cylinder. This allows to change the width of the gap between the inner cylinder of the housing and the wheel.

According to another example, a foaming device comprises a body interposed between a motor and a housing and having a threaded rod. The rod has a longitudinal direction parallel to the axial direction. The device further comprises a housing having a threaded outer surface parallel to the axial direction. A worm, coupled to the threaded rod and to threaded outer surface, allows to axially move the housing with respect to the body. This allows to change the width of the gap between the housing and the wheel and also, preferably, to disassemble the housing from the foaming device.

According to another example, a foaming device comprises a housing having a rack provided on an outer surface of the housing. The rack is coupled with a pinion so that the rotation of the pinion makes the housing move axially. This allows to change the width of the gap between the housing and the wheel and also, preferably, to disassemble the housing from the foaming device.

Preferably, all the components described above to move the housing along the axial direction are mechanically driven.

Also, according to other embodiments, the axial movement of the housing 31 is discrete, that is, the housing 31 can be placed, by using commonly known mechanisms, in a discrete number of fixed positions, preferably having a distance from each other comprised, for instance, between 0.5 mm and 1 mm.

For example, a component similar to a turning hook can be used, which can be switched between two fixed positions.

For instance, a mechanism arranged for moving the whole housing by rotating it from a first to a second position.

According to this embodiment, the housing may comprise a grip or a handle to easily rotate the housing.

Furthermore, in other embodiments, the width of the gap 36 can be changed by axially moving the wheel 34, while the housing 31 remains fixed.

According to a further embodiment, the width of the gap is changed by means of a flexible membrane.

Figure 6:
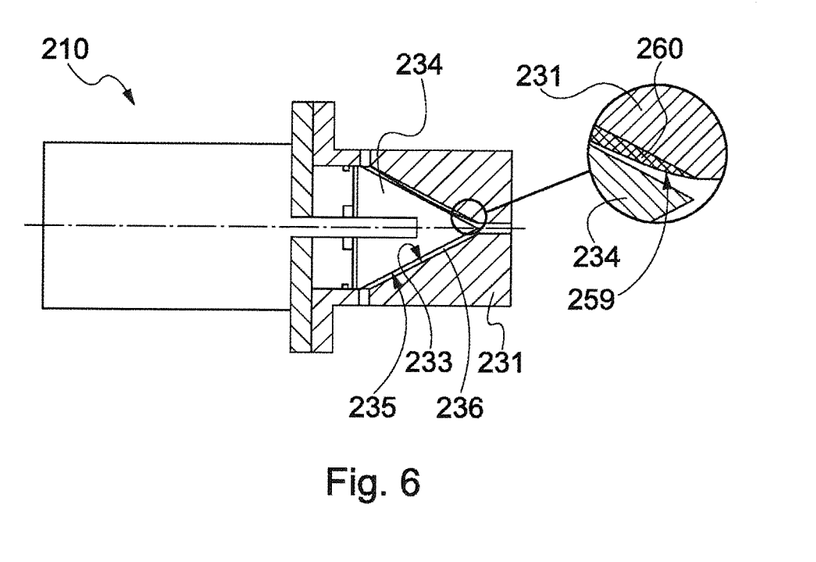
FIG. 6 shows a third embodiment of the foaming device.

For example, as shown in FIG. 6, a housing 231 of a foaming device 210 comprises an inner surface 233 on which a membrane 259 is applied. The membrane 259 is adapted to be inflated/deflated, in a known way, by means of a gas 260 in order to change the width of the gap 236 between the housing 231 and the wheel 234.

This further embodiment is such to provide the same features of the above embodiments and is an alternative embodiment.

According to other embodiments, the first opening 37 and the second opening 38 have reversed functions, i.e. the first opening 37 serves as an outlet and the second opening 38 serves as an inlet.

Also, in other embodiments, the mixing unit can be provided with more than two openings, arranged along the inner surface 33 of the hollow housing 31, at different heights between the opening at the apex 39 of the inner surface 33 of the cavity 32 and the opening next to the base 42 of the conical cavity 32.

These further openings can serve, according to different embodiments, as either inlets or outlets.

For example, the mixing unit 330 (FIG. 7) has one inlet 337 and a plurality of outlets 338a, 338b, 338c.

Figure 7:
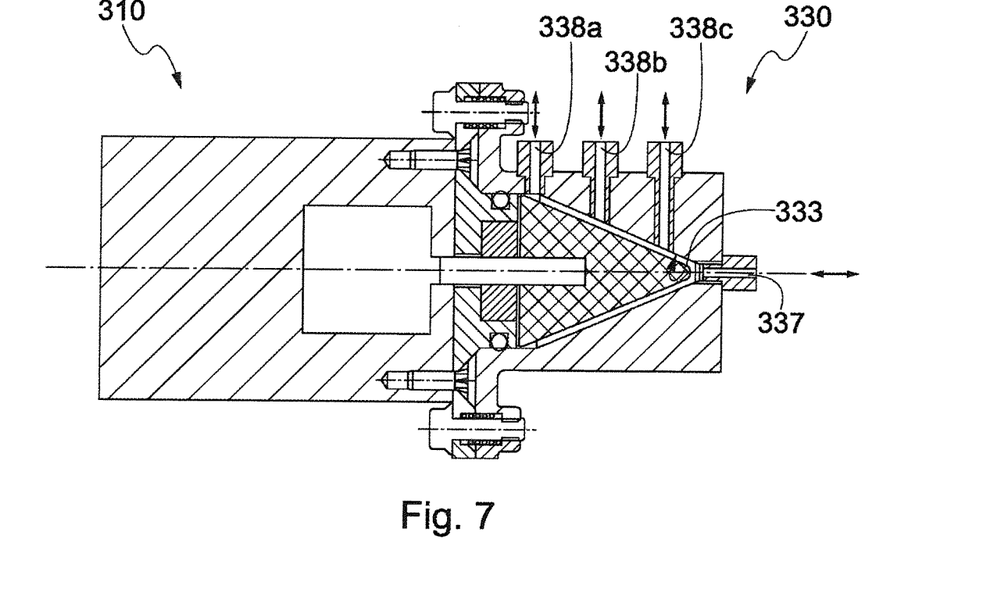
FIG. 7 shows a fourth embodiment of the foaming device.

The additional outlets allow to obtain a foamed liquid having different foaming levels depending on the selected outlet, under the control, for instance, of a control unit.

According to further embodiments the openings arranged along the inner surface 33 serve as inlets, wherein each inlet is controlled, for instance, by a control unit. The plurality of inlets allows to add flavors, syrups, steam or coloring agents to the foamed beverage.

According to other embodiments of the present invention, the outer surface of the wheel and the inner surface of the hollow housing have other kind of symmetric shapes, such as a semi-ellipsoidal (FIG. 8) or a semi-spherical (FIG. 9) shape.

Figure 8:
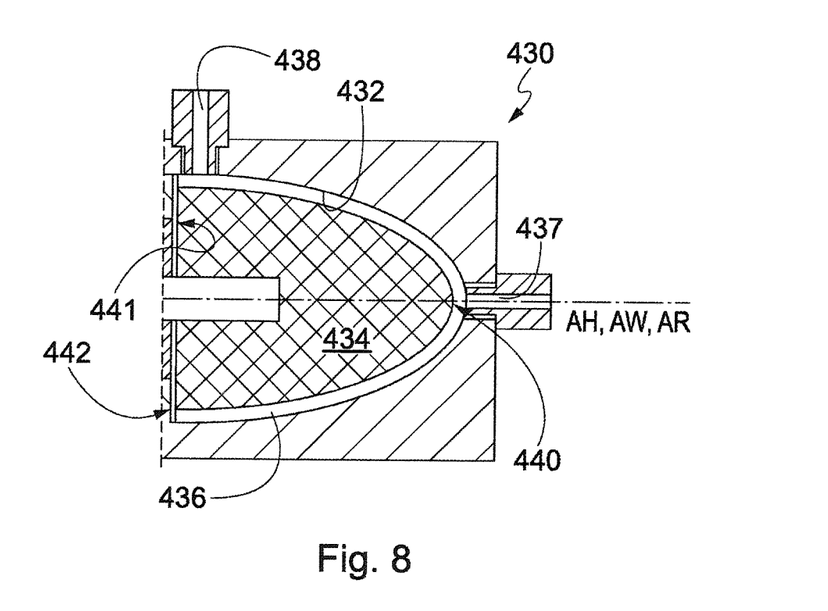
FIG. 8 shows a fifth embodiment of the foaming device.
Figure 9:
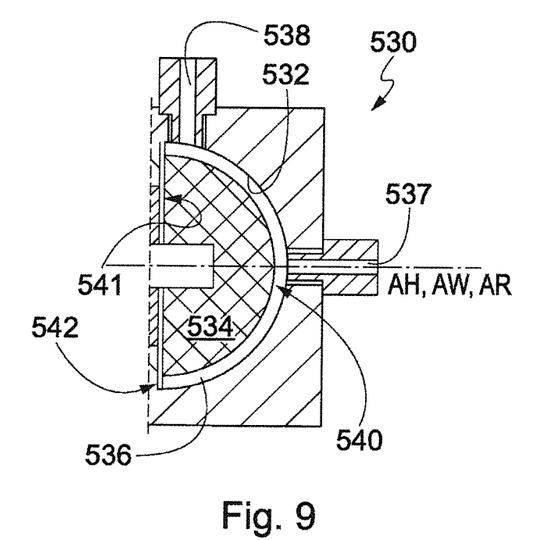
FIG. 9 shows a sixth embodiment of the foaming device.

As in the preferred embodiment, the wheel 434, 534 and the hollow 432, 532 have coincident axes of symmetry AW, AH, and these axes are also coincident with the axis of rotation AR of the wheel and/or of the hollow housing.

Figure 10:
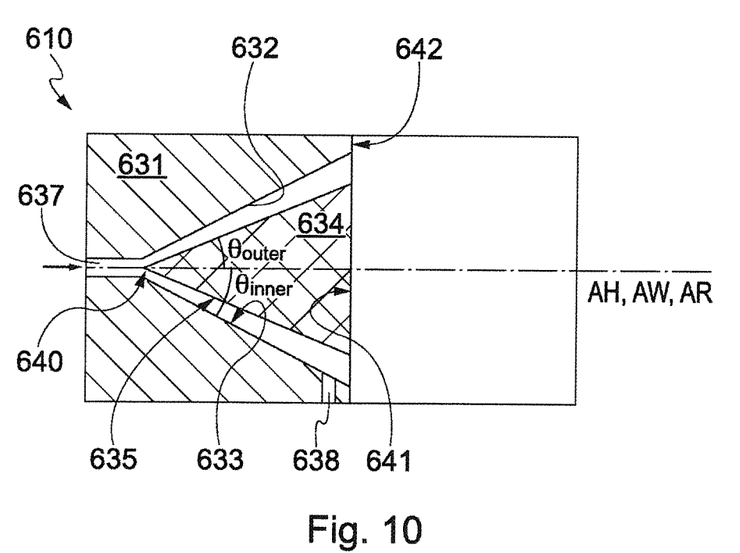
FIG. 10 shows a seventh embodiment of the foaming device.

According to a further embodiment, the outer surface of the wheel and the inner surface of the hollow housing have slightly different shapes, i.e. the circular sections of the inner surface have diameters which change in the direction of the axis of symmetry at a different rate with respect to the diameters of the circular sections of the outer surface, so that the width of gap is not uniform. For example, as shown in FIG. 10, the conical outer surface 635 of the wheel 634 has an angle $\theta_{outer}$ between its axis AW and one of its generatrices which is smaller than the angle $\theta_{inner}$ between the axis AH and a generatrix of the conical inner surface 633 of the hollow housing 631.

All these alternative embodiments have at least two openings; a first opening is arranged alongside the axes of symmetry, in an apical position far away from the base of the cavity, and serves, preferably, as an inlet; a second opening is arranged next to the circular base of the semi-ellipsoidal or semi-spherical wheel, and serves, preferably, as an outlet. As mentioned before, it is possible to use the first opening as an outlet and the second opening as an inlet. Also, the housing can be provided with additional openings, arranged between the apical position and the base of the cavity, which can serve as either inlets or outlets.

According to other embodiments, the relative rotation of the wheel with respect to the housing can be achieved by rotating the housing, while the wheel remains fixed, or also by rotating both the wheel and the housing, in opposite directions relative to each other.

Figure 11:
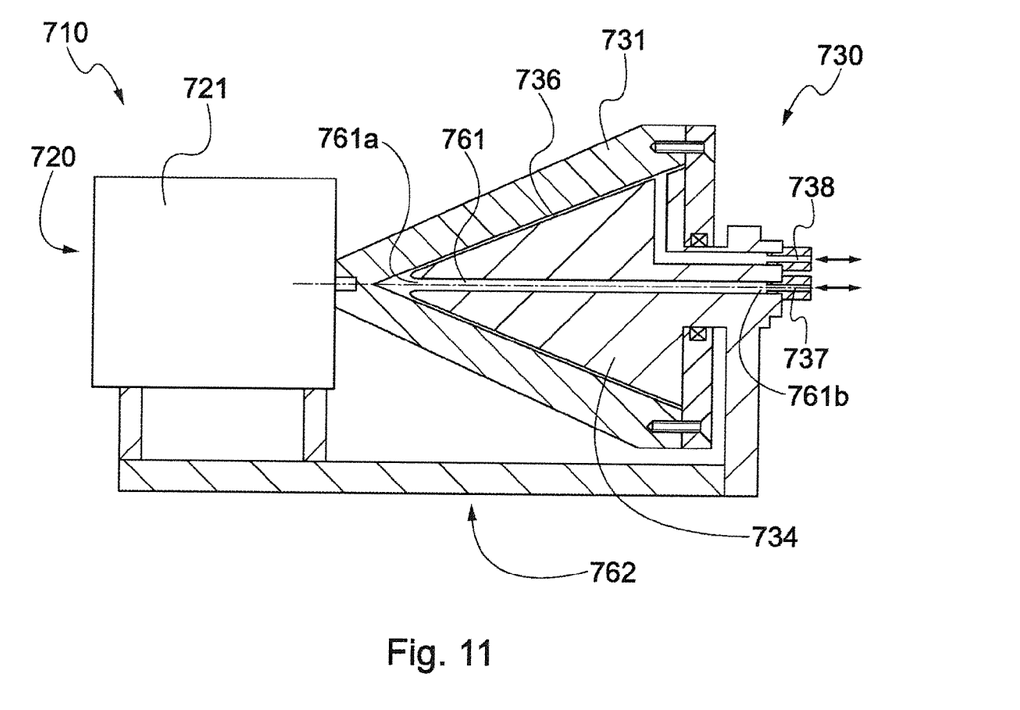
FIG. 11 shows an eighth embodiment of the foaming device.

An example of these embodiments is the foaming device 710 (FIG. 11), wherein the housing 731 can rotate and the wheel 734 is maintained fixed. The housing 731 is connected to the motor 721 adapted to rotate the housing. The wheel 734 is arranged inside the housing 731 and is maintained fixed by means, for example, of a support structure 762 connected to the driving unit 720. The wheel 734 comprises an inner passageway 761, arranged along the axis of symmetry of the wheel AW and having a first end 761a fluidically connected to a gap 736 and a second end 761b fluidically connected to a first opening 737. A second opening 738 is provided, preferably, near the first opening 737.

According to another embodiment, the foaming device is arranged, in use, so that the axis of rotation AR is vertical and with the driving unit 20 on top of the mixing unit 30, or, alternatively, with the mixing unit 30 on top of the driving unit 20.

Figure 4:
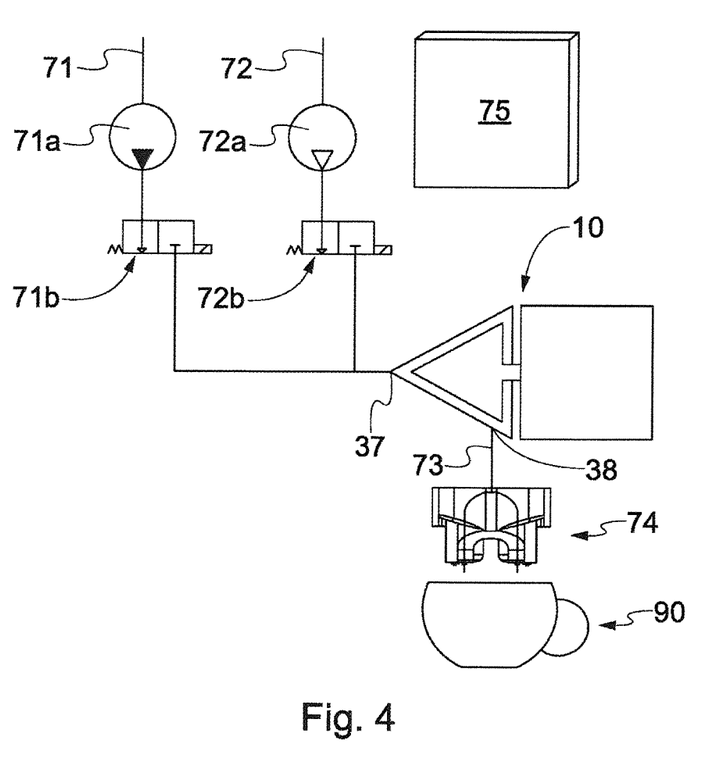
FIG. 4 shows a logic diagram of the foaming device applied to a beverage producing machine.

The foaming device 1 as described above is designed to be included in a beverage-producing machine and is connected, through at least one first opening 37 and at least one second opening 38, to a beverage line 71, 72, of the beverage-producing machine (FIG. 4). In other words, the foaming device is advantageously positioned along a flow path of the liquid to be foamed, so that the foaming device can continuously receive the liquid, foam it and dispense the foamed liquid.

The logic diagram of the foaming device applied to a beverage-producing machine comprises, as shown in FIG. 4, a first line 71 for supplying either cold or hot liquid and a second line 72 for supplying air; these lines 71, 72 are connected, preferably, to the first opening 37 of the foaming device 10 in order to supply it with the air and the liquid to be foamed.

Each line 71, 72 is preferably provided with its own pump 71a, 72a and its own valve 71b, 72b.

The logic diagram further comprises a control board 75 adapted to control, inter alia, the pumps 71a, 72a, the valves 71b, 72b and the foaming device 10 as well as, preferably, the beverage-producing machine. In particular, the control board 75 allows to select the width of the gap 36, on the basis of the characteristics of the liquid to be foamed. Furthermore, in case that the foaming device comprises more than one outlet, the control board 75 allows to select the outlet to be used, in order to dynamically select the foaming level of the foamed liquid.

The second opening 38 of the foaming device 10 is connected, preferably, to a beverage dispenser 74, for example through a duct 73.

Figure 2:
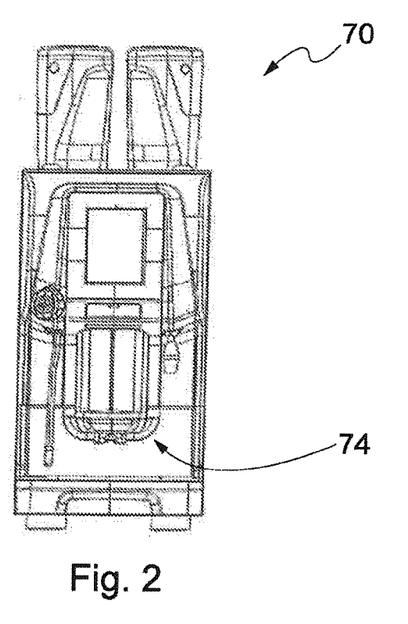
FIG. 2 shows an example of a machine comprising the foaming device.

Preferably, the beverage-producing machine is a coffee machine 70, as shown in FIG. 2.

Figure 3:
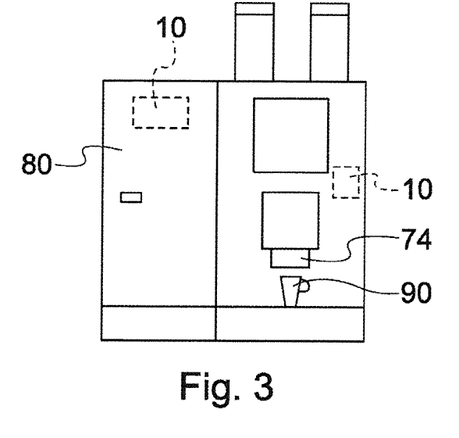
FIG. 3 shows an embodiment where the foaming device is included in a fridge.

According to another embodiment, the beverage producing machine comprises a fridge 80, as shown in FIG. 3, and the foaming device 10 is preferably located in a cooled area of the fridge 80.

The operation of the preferred embodiment of the foaming device 10 of FIG. 1 is as follows.

If the device is configured so as to have the adjustable gap, in a preparation phase, the gap is set, manually or under control of a control unit, at a value such as to provide a foamed liquid having desired characteristics.

During subsequent use, the gap 36 has the determined width set in the aforesaid preparation phase.

When a foamed beverage is required, liquid and air are supplied to the first opening 37 of the housing 31, through the liquid line 71 and the air line 72, respectively, by activating the liquid pump 71a and the air pump 72a and by opening the liquid valve 71b and the air valve 72b.

In order to obtain a foamed liquid, the wheel 34 is rotated.

In case the liquid is changed and the gap is adjustable, the gap is changed by taking into account the characteristics of the liquid, for example its viscosity, in order to obtain the desired foamed beverage.

Since the first opening 37 of the housing 31 is arranged at the apex 39 of the cavity 32, the rotation of the wheel 34 creates a turbulence in the air-liquid mixture. Furthermore, since the wheel 34 has a smaller diameter next to the first opening 37, the speed near the first opening is lower and thus the drag force exerted on the air-liquid mixture is weaker than that exerted where the diameter of the wheel is higher. According to the Taylor-Couette flow, a high shear stress is imparted to the air-liquid mixture, thus leading to foaming of the air and the liquid.

The produced foamed liquid then reaches the outlet 38 and the dispenser 74 and it is delivered to a container, for example a cup 90.

Since the wheel 34 rotates at a lower speed where it has a smaller diameter, i.e., preferably, next to the inlet, this will cause a lower differential speed between the air-liquid mixture and the rotating wheel in the region next to the inlet; this makes the foaming process more effective and constant if compared with a device having a cylindrical wheel (which has the same linear speed along the entire gap), thus allowing to obtain a foamed beverage having a high stability and an excellent texture.

Furthermore, thanks to the adjustable width of the gap 36 or to the multiple openings, the disclosed foaming device 10 is suitable for foaming different kinds of liquids, e.g. liquids having different viscosities, and to obtain different foaming levels.

The shear stress exerted on the air-liquid mixture can be easily adjusted by changing the speed of rotation of the wheel or by changing the gap, if this is adjustable, or by changing both of them, so that the best conditions for producing good quality foam can always be achieved.

For example, hot milk has a lower viscosity than cold milk, therefore, in order to bring shear stress into hot milk, a gap smaller than that used for cold milk can be used.

In addition, when the foaming device is provided with multiple outlets at different heights, liquid foam with different consistencies or foaming levels can be expelled from each outlet.

This feature allows to select different foaming levels, depending on the required beverage, e.g. a cappuccino, which requires a creamy foam, or a milk drink or dessert, which require a thicker foam, or to obtain different foaming levels for a same beverage.

On the other hand, a mixing unit 30 provided with different inlets allows to add flavors, syrups, steam or coloring agents to the foamed beverage.

Of course, obvious modifications and/or variations to the above disclosure are possible, as regards dimensions, shapes, materials, components, circuit elements, connections and contacts, as well as details of logic diagrams and of the described operation method without departing from the scope of the invention as defined by the appended claims.

The invention claimed is:

1. A device for foaming a liquid comprising a mixing unit, said mixing unit comprising:
   a first element having an inner surface,
   a second element having an outer surface,
   a gap having a determined width between the inner surface of the first element and the outer surface of the second element,
   means for changing and setting the width of the gap on the basis of a characteristic of a liquid to be foamed, and
   a first opening and a second opening connected through the gap,
   wherein at least one of said first element or second element is rotatable about an axis of rotation with respect to the other one,
   wherein said inner surface and said outer surface are symmetric with respect to a common axis of symmetry, coincident with said axis of rotation, and have, perpendicularly to the axis of symmetry, circular sections,
   wherein the circular sections have diameters which increase in a direction along said axis of symmetry, and
   wherein said means for changing and setting the width of the gap includes at least one of said first element or second element being moveable in a direction along said axis of symmetry.

2. The device according to claim 1, wherein the axis of symmetry intersects the gap and the first opening is arranged alongside the axis of symmetry.

3. The device according to claim 1, wherein said means for changing and setting the width of the gap includes at least one motor arranged for
   rotating at least one of said first element or second element with respect to the other one, and
   moving one of said first element or second element along the axis of symmetry.

4. The device according to claim 1, wherein said mixing unit comprises further openings located at different heights along the inner surface of the first element, between the first opening and the second opening.

5. The device according to claim 1, wherein said mixing unit further comprises a heating element arranged for heating said liquid.

6. The device according to claim 1, wherein said liquid is milk.

7. A machine for producing beverages comprising:
   a foaming device for foaming a liquid comprising a mixing unit, said mixing unit comprising:
      a first element having an inner surface,
      a second element having an outer surface,
      a gap having a determined width between the inner surface of the first element and the outer surface of the second element,
      means for changing and setting the width of the gap on the basis of a characteristic of a liquid to be foamed, and
      a first opening and a second opening connected through the gap,
      wherein at least one of said first element or second element is rotatable about an axis of rotation with respect to the other one,
      wherein said inner surface and said outer surface are symmetric with respect to a common axis of symmetry, coincident with said axis of rotation, and have, perpendicularly to the axis of symmetry, circular sections,
      wherein the circular sections have diameters which increase in a direction along said axis of symmetry, and
      wherein said means for changing and setting the width of the gap includes at least one of said first element or second element being moveable in a direction along said axis of symmetry,
   a first line for supplying liquid,
   a second line for supplying air,
   a beverage dispenser,
   each of said first and second line being connected to at least one opening of the foaming device.

8. The machine according to claim 7, further comprising a control board,
   a first pump and a first valve located along the first line,
   a second pump and a second valve located along the second line,
   said control board being adapted to control at least said pumps, said valves and said means for changing and setting the width of the gap, said means for changing and setting the width of the gap being a motor arranged for rotating at least one of said first element or second element with respect to the other one and for moving one of said first element or second element along the axis of symmetry.

9. The machine according to claim 7, wherein the axis of symmetry intersects the gap and the first opening is arranged alongside the axis of symmetry.

10. The machine according to claim 7, wherein said means for changing and setting the width of the gap includes at least one motor arranged for
- rotating at least one of said first element or second element with respect to the other one, and
- moving one of said first element or second element along the axis of symmetry.

11. The machine according to claim 7, wherein said mixing unit comprises further openings located at different heights along the inner surface of the first element, between the first opening and the second opening.

12. The machine according to claim 7, wherein said mixing unit further comprises a heating element arranged for heating said liquid.

13. The machine according to claim 7, wherein said liquid is milk.

14. Method for foaming a liquid by means of a foaming device comprising a first element having an inner surface, a second element having an outer surface, a gap having a determined width between said inner surface and said outer surface, means for changing and setting the width of the gap on the basis of a characteristic of a liquid to be foamed, and at least one first opening and at least one second opening which are connected through the gap, wherein at least one of said first element or second element is rotatable about an axis of rotation with respect to the other one, wherein said inner surface and said outer surface are symmetric with respect to a common axis of symmetry, coincident with said axis of rotation, and have, perpendicularly to the axis of symmetry, circular sections, wherein the circular sections have diameters which increase in a direction along said axis of symmetry, and wherein said means for changing and setting the width of the gap includes at least one of said first element or second element being moveable in a direction along said axis of symmetry, said method comprising the steps of:
- supplying a mixture of air and liquid to the at least one first opening,
- rotating at least one of said first element or second element so as to foam the air and the liquid,
- subjecting the mixture to different drag forces along the gap between said inner surface and said outer surface,
- expelling the foamed liquid from the at least one second opening.

15. The method according to claim 14, further comprising the step of:
- changing the gap between said inner surface and said outer surface on the basis of the characteristic of the liquid to be foamed.

16. The method according to claim 15, further comprising the step of:
- choosing to expel the foamed liquid from one of said at least one second opening, in order to dynamically select a foaming level of the liquid to be foamed.

17. The method according to claim 14, further comprising the step of:
- choosing to expel the foamed liquid from one of said at least one second opening, in order to dynamically select a foaming level of the liquid to be foamed.

\* \* \* \* \*